(12) United States Patent
Sato

(10) Patent No.: US 7,643,314 B2
(45) Date of Patent: Jan. 5, 2010

(54) RESONANT SWITCHING POWER SOURCE HAVING FIRST AND SECOND SWITCHING ELEMENTS CONNECTED IN SERIES TO A DC POWER SOURCE

(75) Inventor: Makoto Sato, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 396 days.

(21) Appl. No.: 11/709,098

(22) Filed: Feb. 21, 2007

(65) Prior Publication Data
US 2007/0195562 A1 Aug. 23, 2007

(30) Foreign Application Priority Data
Feb. 22, 2006 (JP) .............................. 2006-045655

(51) Int. Cl.
*H02M 3/335* (2006.01)
(52) U.S. Cl. ................................ 363/21.02; 363/21.12
(58) Field of Classification Search .............. 363/21.02, 363/21.03, 21.12
See application file for complete search history.

(56) References Cited
U.S. PATENT DOCUMENTS

| 4,559,590 | A | * | 12/1985 | Davidson | ................. 363/21.02 |
|---|---|---|---|---|---|
| 5,073,849 | A | * | 12/1991 | Morris | ..................... 363/21.03 |
| 5,396,410 | A | * | 3/1995 | Okochi et al. | ............. 363/21.03 |
| 6,320,765 | B2 | * | 11/2001 | Yasumura | ................. 363/21.02 |
| 6,418,038 | B2 | | 7/2002 | Takahama et al. | |
| 7,110,268 | B2 | * | 9/2006 | Yasumura | ................. 363/21.03 |
| 7,167,384 | B2 | * | 1/2007 | Yasumura | ................... 363/127 |
| 7,218,534 | B2 | * | 5/2007 | Yasumura | ................ 363/21.06 |

* cited by examiner

*Primary Examiner*—Jeffrey L Sterrett
(74) *Attorney, Agent, or Firm*—Bachman & LaPointe, P.C.

(57) ABSTRACT

The transformer 5 used for the present invention, comprises a core of E-shaped first and second core halves 5g, 5h coupled together in opposed relation to each other to form a closed magnetic circuit or circuits for supporting primary and secondary windings 5a, 5b wound around first and second core halves 5g, 5h; and a gap 5n defined between end surfaces 5l, 5m of first and second core halves 5g, 5h by spaced relation of end surfaces 5l, 5m to also form a reduced section area 5v by contacting the end surfaces 5l, 5m. When a large amount of electric current flows through resonant series circuit 14, reduced section area 5v comes to magnetic saturation to reduce an excitation inductance 5f of transformer 5, more increase excitation current $I_{LP}$ and thereby perform steady operation in any load condition. When a small amount of electric current flows through resonant series circuit 14, excitation inductance 5f of transformer 5 is increased to repress excitation current $I_{LP}$, thereby reducing power loss during light or no load to improve power conversion efficiency during light load.

5 Claims, 13 Drawing Sheets

RESONANT SWITCHING POWER SOURCE HAVING FIRST AND SECOND SWITCHING ELEMENTS CONNECTED IN SERIES TO A DC POWER SOURCE

TECHNICAL FIELD

This invention relates to a resonant switching power source device, in particular, of the type capable of improving the power conversion efficiency during light or no load.

BACKGROUND OF THE INVENTION

Prior art current resonant switching power source devices are widely well known as beneficially indicating less noise and high power conversion efficiency because they can accomplish a zero current switching (ZCS) with a resonance circuit which converts electric current flowing through a just switched switching element into a sine wave form for reduction in switching loss. By way of an example, a prior art current resonant switching power source shown in FIG. 15, comprises a first MOS-FET 2 of high voltage side as a first switching element and a second MOS-FET 3 of low voltage side as a second switching element, first and second MOS-FETs 2 and 3 being connected in series to a DC power source 1; a first capacitor 6 for voltage resonance connected in parallel to second MOS-FET 3; a second capacitor 4 for current resonance and a primary winding 5a of a transformer 5 connected in parallel to first capacitor 6; a rectifying smoother 9 which includes an output diode 7 for commutation and an output capacitor 8 for smoothing connected between a secondary winding 5b of transformer 5 and DC output terminals 10 and 11; and a control circuit 13 for forwarding drive signals $V_{GH}$ and $V_{GL}$ to first and second MOS-FETs 2 and 3 in response to DC output voltage $V_{RL}$ applied from rectifying smoother 9 through DC output terminals 10 and 11 to an electric load 12. Transformer 5 has an equivalent circuit which includes a leakage inductance 5d connected in series to primary winding 5a and an excitation inductance 5e connected in parallel to primary winding 5a. A resonant series circuit 14 comprises second capacitor 4, primary winding 5a, excitation inductance 5e and leakage inductance 5d of transformer 5 connected in parallel to second MOS-FET 3. In the current resonant switching power source device shown in FIG. 15, control circuit 13 produces drive signals $V_{GH}$ and $V_{GL}$ to alternately turn first and second MOS-FETs 2 and 3 on and off so that charging and discharging currents as resonance current flow through leakage inductance 5d and primary winding 5a into and from second capacitor 4 to supply DC output of substantially constant DC voltage $V_{RL}$ to load 12 from secondary winding 5b of transformer 5 through rectifying smoother 9. Control circuit 13 picks up DC output voltage $V_{RL}$ applied from output capacitor 8 of rectifying smoother 9 through DC output terminals 10 and 11 to load 12; determines the on-period of first MOS-FET 2 depending on level of an error voltage, the differential between detected output voltage $V_{RL}$ and reference voltage for regulating a criterion measure of output voltage $V_{RL}$; sets the on-period of second MOS-FET 3 for a given period over a half cycle in a sine wave of resonance frequency determined by capacitance in second capacitor 4 and leakage inductance 5d of transformer 5; and executes the alternate on-off operation of first and second MOS-FETs 2 and 3.

FIGS. 16 and 17 indicate a waveform chart of voltages and electric currents at selected locations of the current resonant switching power source device shown in FIG. 15. FIGS. 16 and 17 show the variations during respectively heavy and no or light loads wherein time charts (A) and (B) represent voltage variation in drive signals $V_{GH}$ and $V_{GL}$ applied to each gate terminal of first and second MOS-FETs 2 and 3; (C) and (D) represent respectively voltage $V_{QH}$ applied between drain and source terminals of first MOS-FET 2, and electric current $I_{QH}$ flowing through first MOS-FET 2; (E) and (F) represent respectively voltage $V_{QL}$ applied between drain and source terminals of second MOS-FET 3, and electric current $I_{QL}$ flowing through second MOS-FET 3; (G) represents electric current $I_{DO}$ flowing through output diode 7 of rectifying smoother 9; and (H) represents electric current $I_{LP}$ flowing through excitation inductance 5e of transformer 5. As shown in FIG. 17 (H), excitation current for transformer 5, namely, electric current flowing through excitation inductance 5e of transformer 5, oscillates at a substantially same rate across a zero line toward positive and negative sides during no or light load, however, FIG. 16 (H) shows that a central line of the amplitude is biased toward negative side to unilaterally excite transformer 5 during heavy load. Also, FIGS. 18 (A) and (B) indicate variation in magnetic flux $\phi$ of magnetic core in transformer 5 relative to excitation current $I_{LP}$ for transformer 5 under respectively no or light and heavy loads. In detail, FIG. 18 (A) reveals magnetization by magnetic flux at a substantially same rate across a zero line toward positive and negative sides under no or light load, however on the contrary, FIG. 18 (B) exemplifies magnetization by magnetic flux biased toward negative side under heavy load. For explanatory convenience, coersive force and residual flux are neglected in FIGS. 18 (A) and (B).

In the device shown in FIG. 15, when first MOS-FET 2 is turned on during period from point $t_0$ to $t_1$, resonance current runs through resonant series circuit 14 of leakage inductance 5d and excitation inductance 5e of transformer 5 and second capacitor 4 to electric charge second capacitor 4 and simultaneously excite transformer 5. Then, when first MOS-FET 2 is turned off at point $t_1$, electric current flowing through resonant series circuit 14 is diverted and sent through a parasitic diode 3a in second MOS-FET 3. At this time, since almost no voltage $V_{QL}$ is impressed between drain and source terminals of second MOS-FET 3, second MOS-FET 3 can be turned on from off for zero voltage switching (ZVS).

When second MOS-FET 3 is turned on at point $t_2$, second capacitor 4 is discharged by resonance current flowing through resonant series circuit 14 so that resonance current passes from second capacitor 4 through primary winding 5a and leakage inductance 5d of transformer 5 and second MOS-FET 3 to second capacitor 4. At this moment, voltage induced on secondary winding 5b of transformer 5 is clamped with DC output voltage $V_{RL}$, and therefore, voltage developed on primary winding 5a of transformer 5 is clamped with a product value of DC output voltage $V_{RL}$ and turn ratio $N_P/N_S$ of transformer 5 ($N_P$ and $N_S$: numbers of turn for respectively primary and secondary windings 5a and 5b). In this way, resonance current flows through resonant series circuit 14 due to resonant action by leakage inductance 5d of transformer 5 and second capacitor 4, during which electric energy can be transmitted to secondary side. After point $t_2$, negative excitation current $I_{LP}$ through excitation inductance 5e is gradually reduced due to resonant action by leakage and excitation inductances 5d and 5e of transformer 5 and second capacitor 4, and then, after excitation current $I_{LP}$ exceeds zero level, it begins flowing in the adverse direction because excitation current $I_{LP}$ flows from leakage and excitation inductances 5d and 5e into second capacitor 4. Accordingly, as transformer 5 is excited in the adverse direction, voltage imposed on primary winding 5a of transformer 5 is lowered. When the imposed voltage drops below the product of DC output voltage $V_{RL}$ and turn ratio $N_P/N_S$ of transformer 5, voltage on primary winding 5a is released from clamping not to transport electric energy to secondary side. During this period, only resonance current flows through resonant series circuit 14 by virtue of resonant action by leakage and excitation inductances 5d and 5e of transformer 5. Thereafter, when second MOS-FET 3 is turned off at point $t_3$, electric current flowing through resonant series circuit 14 is recovered to DC power source 1 through a parasitic diode 2a of first MOS-FET 2. During this period, as almost no voltage is applied on drain and source terminals of first MOS-FET 2, zero voltage switching can be accomplished by switching first MOS-FET 2 from off to on during this period. Repetition of the foregoing operations causes pulsatile voltage to appear on secondary winding 5b of transformer 5 and convert through rectifying smoother 9 into a DC output voltage $V_{RL}$ applied on load 12 connected to DC output terminals 10 and 11.

When load 12 becomes heavier than in usual operation, electric energy transmitted from primary to secondary side of transformer 5 during the on-period of second MOS-FET 3 becomes greater with increase in discharged amount from second capacitor 4, diminishing charged voltage on second capacitor 4. At this moment, first MOS-FET 2 is turned on, voltage applied from DC power source 1 on primary winding 5a rises, and increasing excitation current $I_{LP}$ for transformer 5 flows through resonant series circuit 14 of second capacitor 4, and primary winding 5a and excitation and leakage inductances 5e and 5d of transformer 5, returning charged voltage on second capacitor 4 to the original level to establish stabilized DC output voltage $V_{RL}$ on load 12. Thus, if load 12 becomes heavier than in usual operation, excitation current $I_{LP}$ for transformer 5 increases during the on-period of first MOS-FET 2, the device serves to keep charged voltage on second capacitor 4 at a constant level when second MOS-FET 3 is turned on. For that reason, excitation current $I_{LP}$ for transformer 5 during heavy load has a same amplitude as that during no or light load as shown in FIGS. 18 (A) and 18 (B), but there is an increase in unidirectional electric current, that is, electric current flowing through first MOS-FET 2 turned on.

As mentioned above, the current resonant switching power source device shown in FIG. 15 is designed to charge second capacitor 4 with electric current flowing through resonant series circuit 14 to transmit electric energy accumulated in second capacitor 4 to secondary side. Accordingly, unless magnitude of excitation current for transformer 5 is determined in accordance with energy amount necessary at the time of heavy load, no sufficient amount of energy can be supplied to load 12. On the other hand, the on-period of second MOS-FET 3 is a stationary time span over a half cycle of sine wave having the resonant frequency determined by capacitance of leakage inductance 5a of transformer 5 and second capacitor 4. Then, when second MOS-FET 3 is turned on, electric energy is transmitted to secondary side, and at the same time, transformer 5 is magnetized in the adverse direction. Accordingly, magnetized amount in the adverse direction is constant or same regardless of magnitude in load. In other words, amplitude of excitation current for transformer 5 comes to a constant level independently of any condition of load 12, and a large amount of excitation current flows even during no or light load. Accordingly, power loss in transformer 5 incurred by excitation current is not lowered even during no or light load, thereby causing considerable reduction in power conversion efficiency.

To solve the foregoing problem, a proposal has been made in U.S. Pat. No. 6,418,038 to M. Takahama, et al., which discloses a resonant DC-DC converter of bridge type for setting a switching frequency during light load above resonance frequency determined by an inductance of a primary coil and an interwinding capacitance of a secondary coil in a converter transformer. In detail, during heavy load, the converter is operated with a switching frequency near resonance frequency of resonant series circuit which comprises a resonance inductance, inductance of primary coil in transformer and resonance capacitor, and during light load, the converter is operated to stabilize output voltage with switching frequency near resonance frequency of parallel resonant circuit which comprises resonance inductance, inductance of primary coil in transformer, and equivalent capacitance in primary coil equivalent to the interwinding capacitance in secondary coil. As switching frequency during light load is higher than that during heavy load, excitation current during light load can be reduced accordingly to improve power conversion efficiency.

However, the foregoing DC-DC converter of bridge type has a trouble in normal operation because it does not produce sufficient interwinding capacity in secondary coil under the low secondary output voltage, thereby causing switching frequency during light load to abnormally rise. Also, it disadvantageously has a large fluctuation in switching frequency between light and heavy loads, and this prevents stabilized operation of the converter.

Accordingly, an object of the present invention is to provide a resonant switching power source device capable of reducing power loss during light or no load to improve power conversion efficiency during light load.

Another object of the present invention is to provide a resonant switching power source device capable of performing steady operation in any load condition.

SUMMARY OF THE INVENTION

The resonant switching power source device according to the present invention, comprises first and second switching elements (2, 3) connected in series to a DC power source (1); a resonant series circuit (14) which comprises a current resonance capacitor (4), and a primary winding (5a) and an inductance (5d) of a transformer (5) connected in parallel to first or second switching element (2, 3); and a rectifying smoother (9) connected to a secondary winding (5b) of transformer (5). Transformer (5) comprises a core of first and second core halves (5g, 5h) coupled together in opposed relation to each other to form a closed magnetic circuit or circuits for supporting primary and secondary windings (5a, 5b) wound around first and second core halves (5g, 5h); and a gap (5n) defined between end surfaces (5l, 5m) of first and second core halves (5g, 5h) by spaced relation of end surfaces (5l, 5m) to also form a reduced section area (5v) by contacting the end surfaces (5l, 5m). The on-off operation of first and second switching elements (2, 3) causes a resonance current to flow through resonance capacitor (4), inductance (5d), primary winding (5a) of transformer (5) and first or second switching element (2, 3) to produce a DC output from secondary winding (5b) of transformer (5) through rectifying smoother (9). Reduced section area (5v) comes to magnetic saturation to reduce an excitation inductance (5f) of transformer (5) when a large amount of electric current flows through resonant series circuit (14). Excitation inductance (5f) of transformer (5) is increased when a small amount of electric current flows through resonant series circuit (14).

During no or light load (12) smaller than in usual operation, a small amount of electric current flows through resonant series circuit (14) to increase excitation inductance (5f) of transformer (5), thus reducing excitation current $(I_{LP})$ for transformer (5). When load (12) becomes heavier than in usual operation while increased electric current flows through resonant series circuit (14), reduced section area (5v) in transformer (5) comes to magnetic saturation, and therefore, reduces excitation inductance (5f) to more increase excitation current ($I_{LP}$) for transformer (5). Meanwhile, as second capacitor (4) in resonant series circuit (14) is electrically charged by excitation current ($I_{LP}$), second capacitor (4) is charged by larger excitation current ($I_{LP}$) during heavy load (12) greater than in usual operation to accumulate in second capacitor (4) sufficient amount of electric energy to be transmitted to secondary winding (2b) of transformer (5). In this way, the device can improve power conversion efficiency during no or light load while reducing power loss in transformer (5) because no large excitation current ($I_{LP}$) flows for transformer (5) during light or no load. Also, the device can be stably operated in any load condition because there is neither large fluctuation nor need therefor in oscillation frequency of first and second switching elements (2, 3) between light or no and heavy load periods.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Embodiments of the resonant switching power source device according to the present invention will be described hereinafter in connection with FIGS. 1 to 14 of the drawings. Same reference symbols as those shown in FIGS. 15 to 18 are applied to similar portions in FIGS. 1 to 14, omitting explanation therefor.

Figure 1:
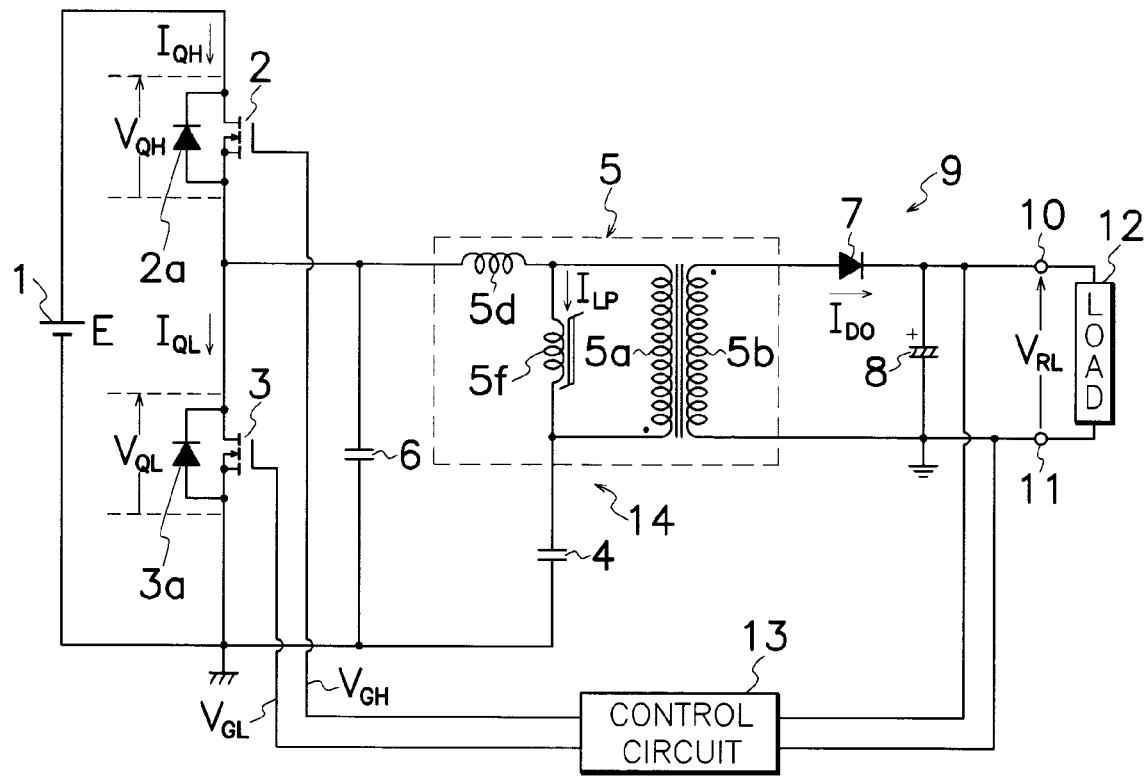
FIG. 1 is an electric circuit diagram showing a first embodiment of a resonant switching power source device according to the present invention.
Figure 2:
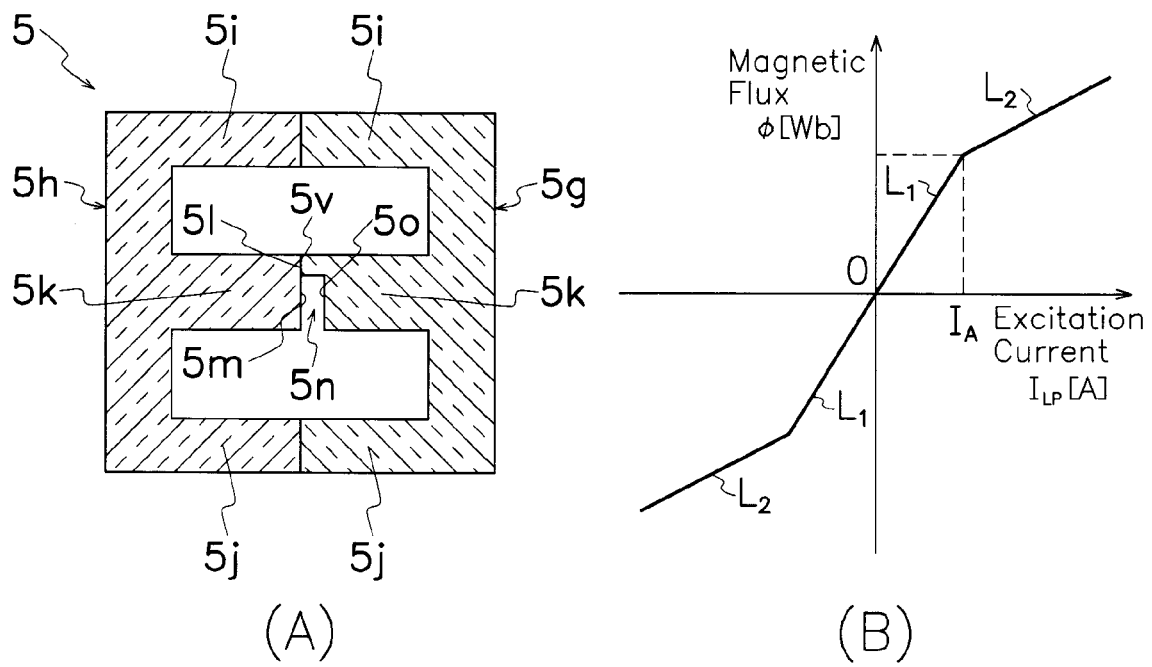
FIG. 2 is a sectional view of a magnetic core used in the first embodiment, and a graph showing a magnetization characteristic of the magnetic core.
Figure 15:
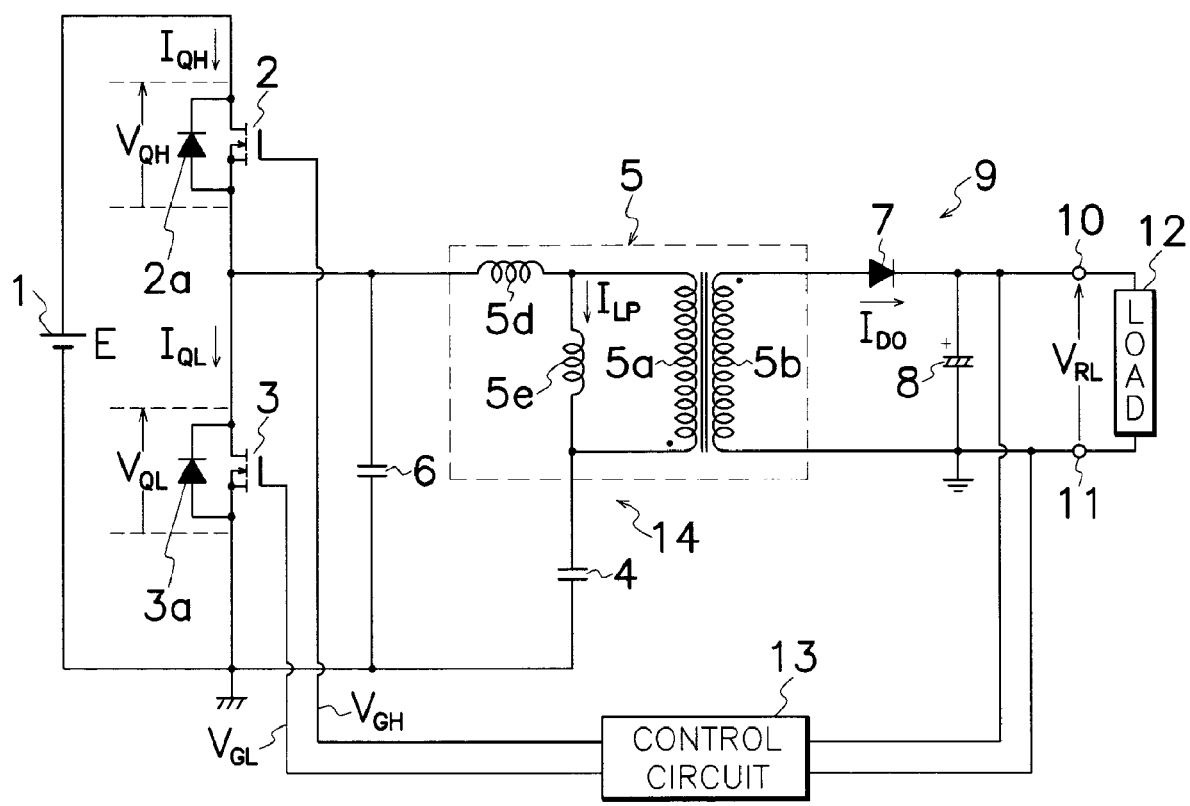
FIG. 15 is an electric circuit diagram of a prior art resonant switching power source device.
Figure 16:
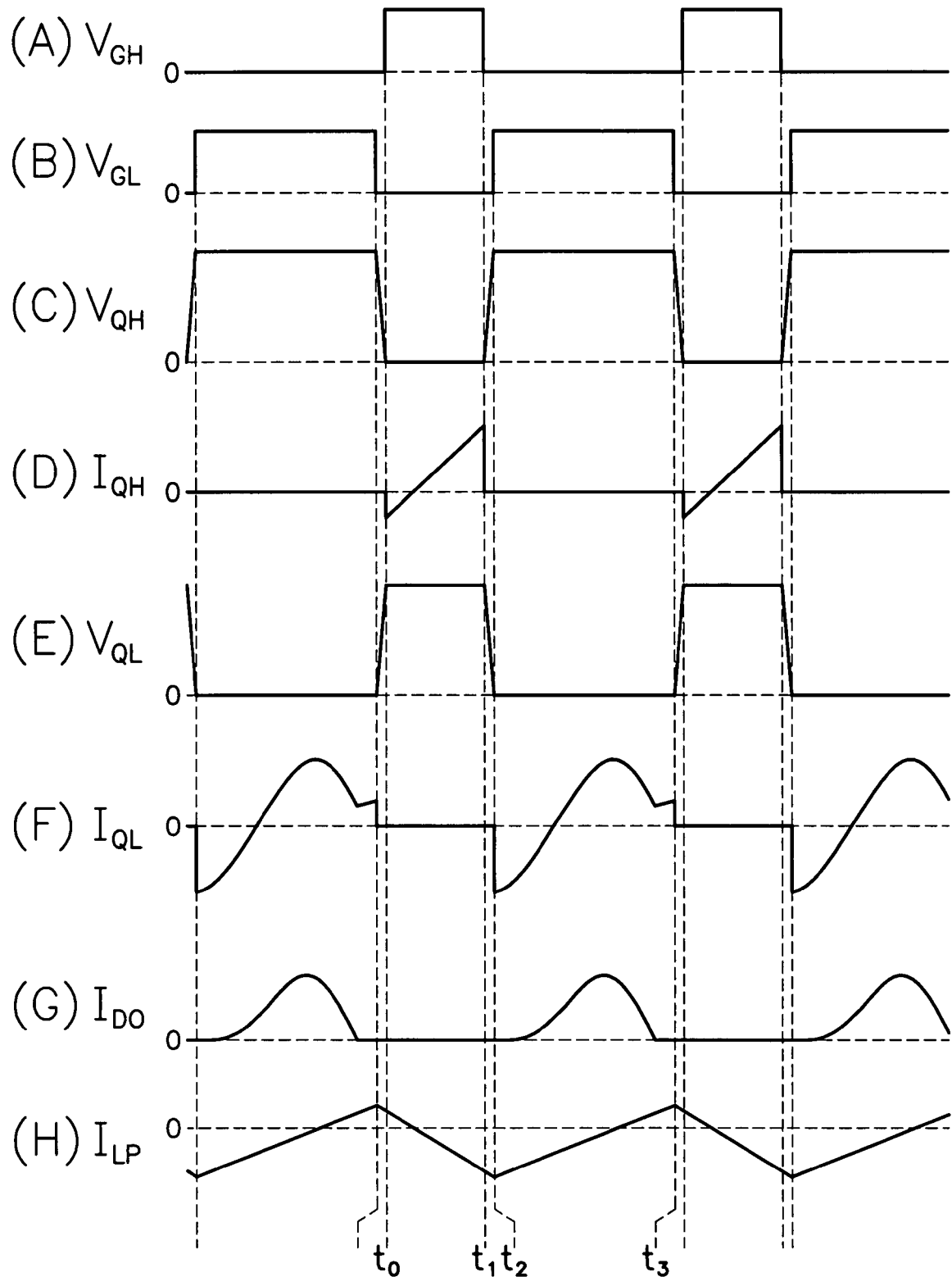
FIG. 16 is a waveform chart indicating variation in voltages and electric currents at selected locations in the circuit diagram shown in FIG. 15 during the heavy load.
Figure 17:
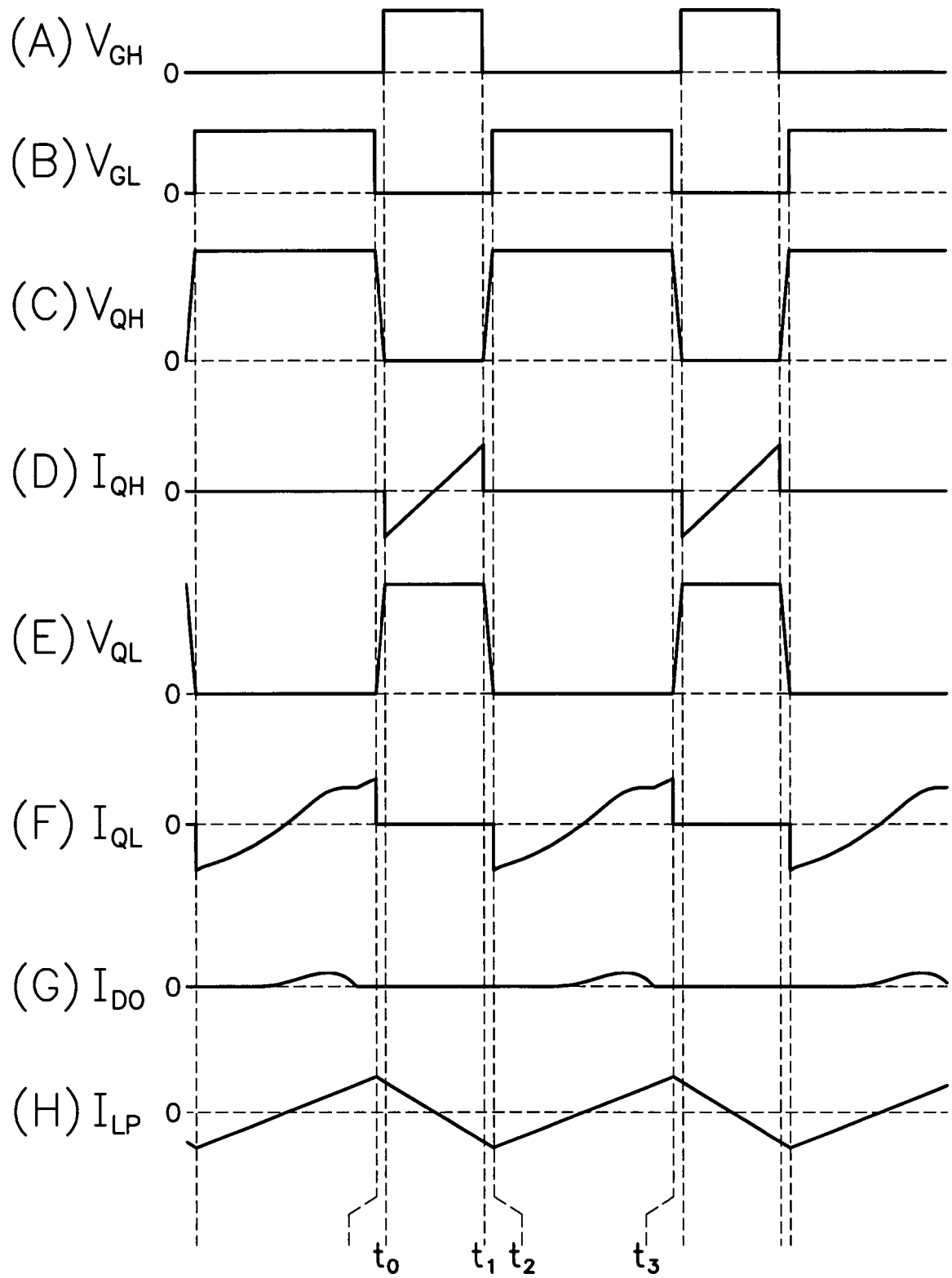
FIG. 17 is a waveform chart indicating variation in voltages and electric currents at selected locations in the circuit diagram shown in FIG. 15 during the no load.
Figure 18:
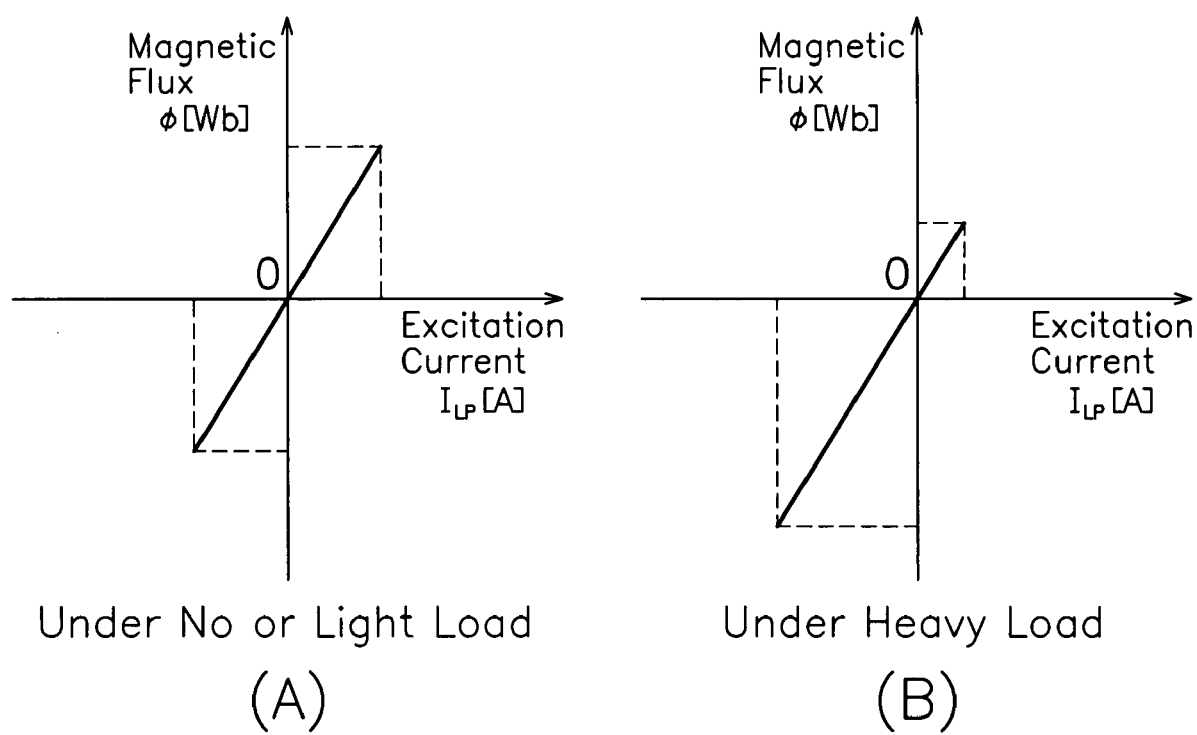
FIG. 18 is a graph showing magnetization characteristics of the magnetic core in a transformer shown in FIG. 15 during no and heavy loads.

FIG. 1 is an electric circuit diagram showing a first embodiment of the resonant switching power source device according to the present invention which has a different transformer 5 from that in the prior art device shown in FIG. 15. Specifically, the transformer 5 used in the invention's device shown in FIG. 1 comprises, as illustrated in FIG. 2 (A), a magnetic core of first and second E-shaped core halves 5g, 5h coupled together in opposed relation to each other to form a closed magnetic circuit or circuits for supporting primary and secondary windings 5a, 5b wound around first and second core halves 5g, 5h. First core half 5g has a pair of outer legs 5i and 5j and an intermediate leg 5k formed with a notch 5o on an end surface 5l of intermediate leg 5k. Second core half 5h also has a pair of outer legs 5i and 5j and an intermediate leg 5k without any notch 5o. First and second core halves 5g and 5h are positioned opposite to each other so that end surfaces 5l and 5m of facing intermediate legs 5k are in contact to each other through a reduced section area 5v to form a gap 5n defined by end surfaces 5l and 5m and reduced section area 5v. Primary and secondary windings 5a and 5b shown in FIG. 1 are wound around a bobbin (not shown) which surrounds opposed intermediate legs 5k to form a closed magnetic circuit or circuits. Transformer 5 shown in FIG. 2 (A) serves as a variable inductance having a pair of E-shaped core halves, in lieu of excitation inductance 5e shown in FIG. 15. Accordingly, excitation inductance 5f of transformer 5 serves as a variable reactor whose inductance is equivalently variable depending on excitation current $I_{LP}$.

FIG. 2 (B) is a graph showing a variation in magnetic flux φ induced in magnetic circuits of transformer 5 shown in FIG. 2 (A) with change in excitation current $I_{LP}$. When voltage is applied on primary winding 5a of transformer 5, excitation current $I_{LP}$ increases in a small range of excitation current $I_{LP}$ with a first inductance $L_1$ of a large value determined by saturation magnetic flux density in reduced section area 5v where end surfaces 5l and 5m of intermediate legs 5k are in contact to each other. When excitation current $I_{LP}$ for transformer 5 reaches a predetermined value $I_4$, reduced section area 5v of intermediate leg 5k comes to the magnetic saturation to transform excitation inductance 5f from first inductance $L_1$ into a second inductance value $L_2$ of a small value determined by saturation magnetic flux density in gap 5n of a given distance between end surfaces 5l and 5m, and therefore, increment amount of magnetic flux φ is lowered with increase in excitation current $I_{LP}$ in a large range of excitation current $I_{LP}$. Other configurations in FIG. 1 are essentially similar to those shown in FIG. 15.

Figure 3:
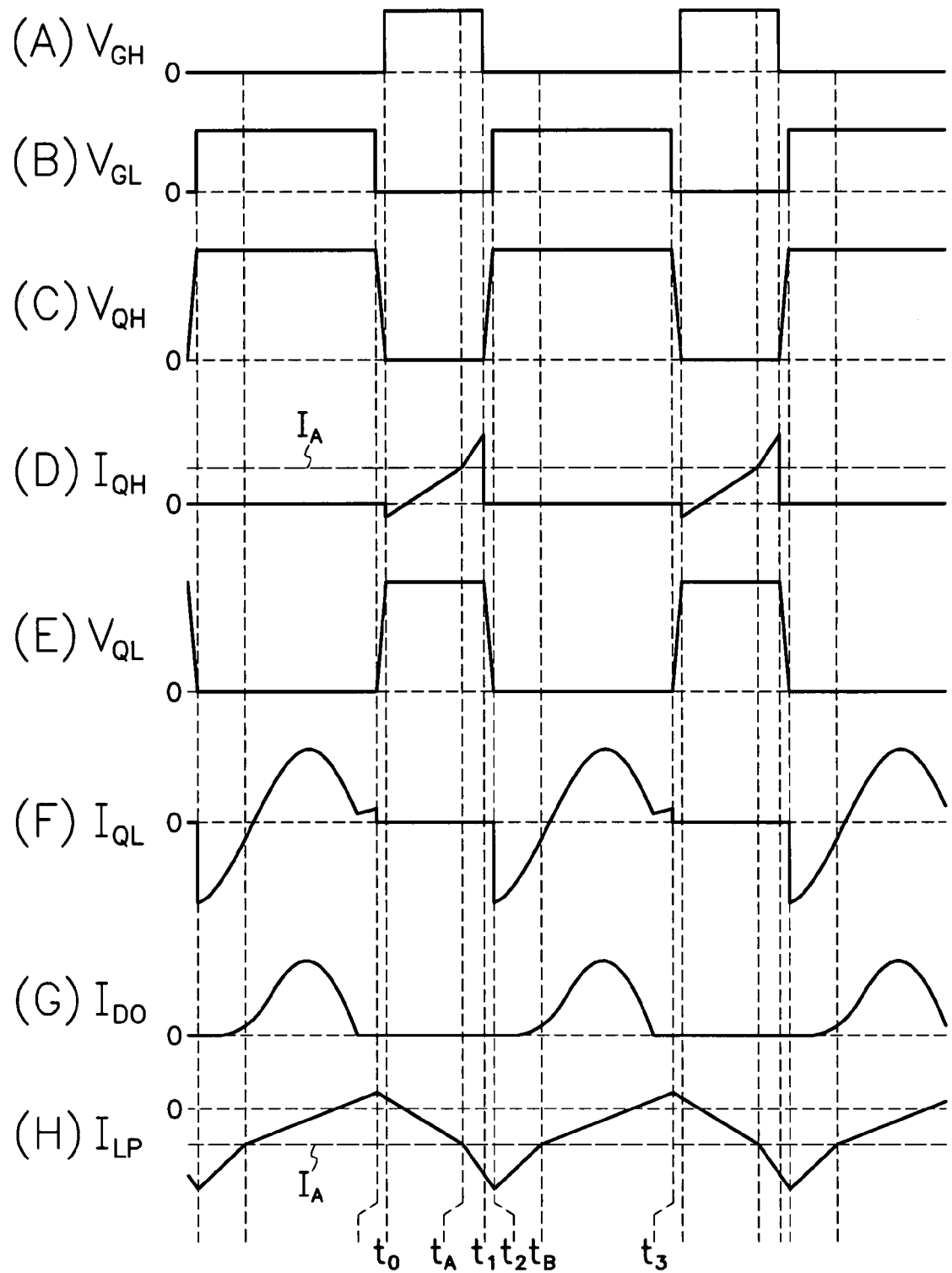
FIG. 3 is a waveform chart indicating variation in voltages and electric currents at selected locations in the circuit diagram shown in FIG. 1 during the heavy load.
Figure 4:
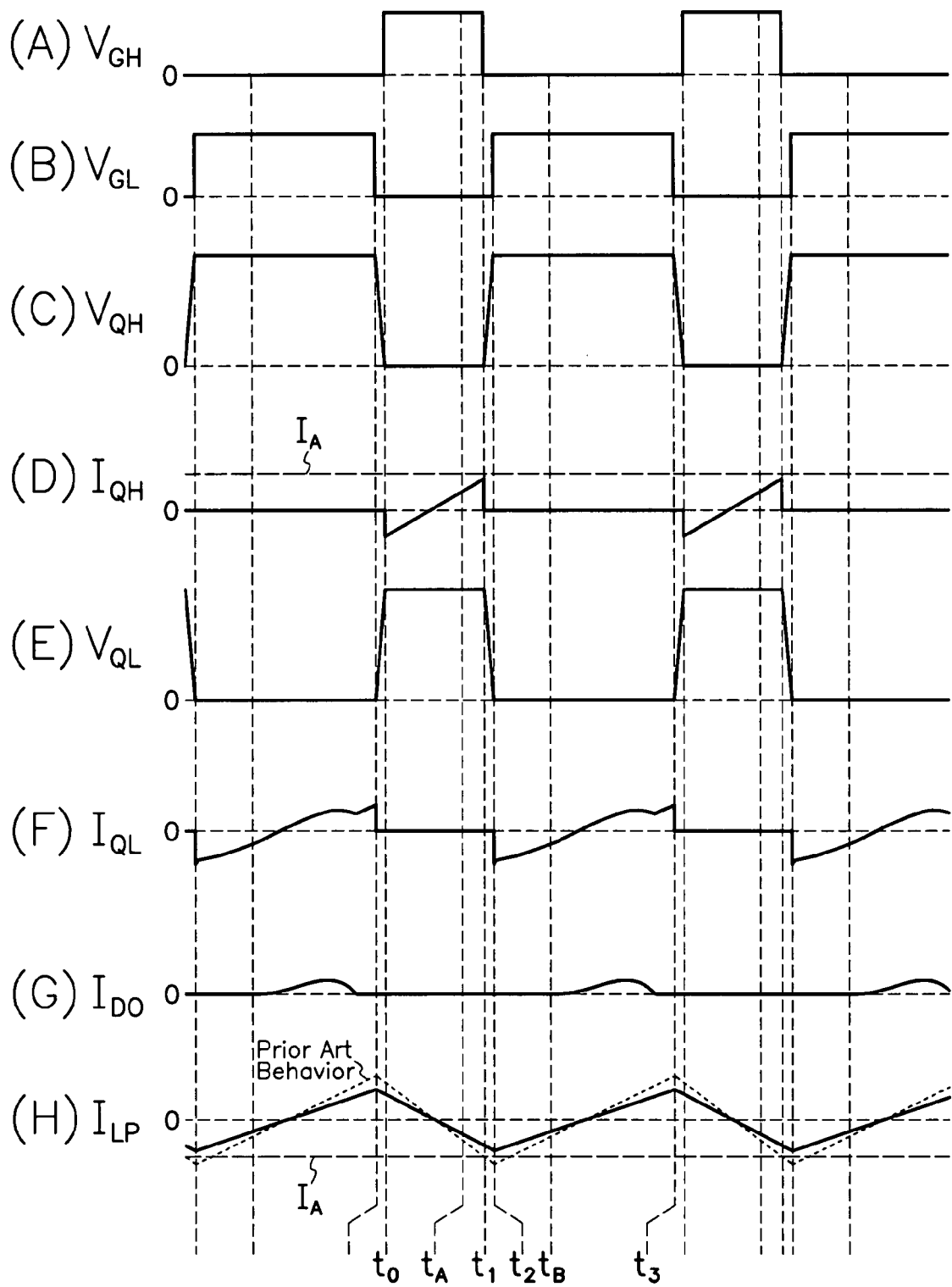
FIG. 4 is a waveform chart indicating variation in voltages and electric currents at selected locations in the circuit diagram shown in FIG. 1 during the light load.
Figure 5:
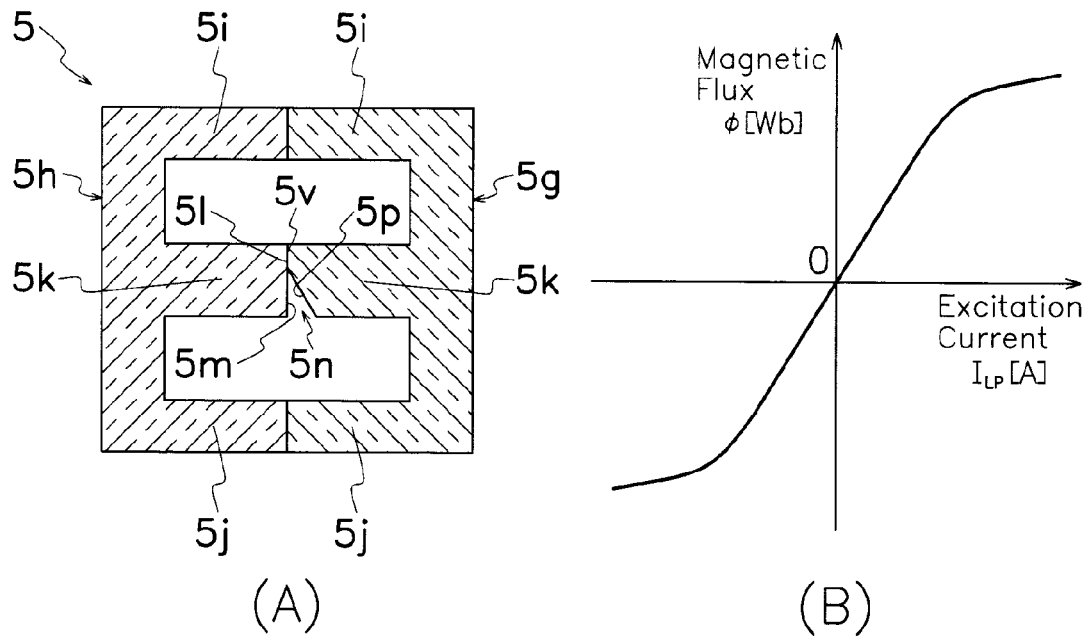
FIG. 5 is a sectional view of a magnetic core used in a second embodiment, and a graph showing a magnetization characteristic of the magnetic core.

FIGS. 3 and 4 are waveform charts indicating variation in voltages and electric currents at selected locations in the circuit diagram shown in FIG. 1 during respectively the heavy and light loads. FIG. 3 (A) to (H) and FIG. 4 (A) demonstrate variation in voltages and electric currents at the same locations corresponding to those in respectively FIG. 16 (A) to (H) and FIG. 17 (A) to (H).

In the circuitry shown in FIG. 1, when first MOS-FET 2 is turned on at point to during the heavy load 12 greater than in usual operation, begins flowing through resonant series circuit 14 resonant current $I_{QH}$ of the resonance frequency determined by composite inductance of excitation inductance 5f and leakage inductance 5d in transformer 5 and capacitance in second capacitor 4, and then, resonant current $I_{QH}$ gradually increases as shown in FIG. 3 (D) to charge second capacitor 4. At this moment, as a small amount of excitation current $I_{LP}$ flows through resonant series circuit 14 including excitation inductance 5f in transformer 5, excitation inductance 5f has first inductance $L_1$ of large value. When electric currents $I_{QH}$ and $I_{LP}$ through resonant series circuit 14 come to a predetermined level $I_A$ at point $t_A$, magnetic saturation appears in reduced section area 5v and gap 5n in transformer 5 to transform excitation inductance 5f into second inductance $L_2$ of small value. Accordingly, electric currents $I_{QH}$ and excitation current $I_{LP}$ increasingly pass through resonant series circuit 14 as shown in FIGS. 3 (D) and 3 (H) to accumulate a full and enough amount of electric energy in second capacitor 4 for heavy load period.

When first MOS-FET 2 is turned off from on at point $t_1$, electric current flowing through resonant series circuit 14 is diverted and sent through parasitic diode 3a of second MOS-FET 3 in the off condition. At this moment, second MOS-FET 3 is turned on from off at point $t_2$ with zero voltage switching because almost no voltage $V_{QL}$ is applied between drain and source terminals of second MOS-FET 3 as shown in FIG. 3 (E). After second MOS-FET 3 is turned on at point $t_2$, electric current $I_{QL}$ shown in FIG. 3 (F) flows as resonant current through resonant series circuit 14 so that electric current $I_{QL}$ goes from second capacitor 4, primary winding 5a and leakage inductance of transformer 5 and second MOS-FET 3 to second capacitor 4 to discharge second capacitor 4. At this point in time, as voltage on secondary winding 5b of transformer 5 is clamped with DC output voltage $V_{RL}$, voltage induced on primary winding 5a of transformer 5 is clamped with the product value of DC output voltage $V_{RL}$ and turn ratio $N_P/N_S$ of transformer 5. Accordingly, resonance current flows through resonant series circuit 14 due to resonant action by leakage inductance 5d of transformer 5 and capacitance of second capacitor 4 to transmit electric energy to secondary side of transformer 5. Simultaneously, resonance current runs through resonant series circuit 14 by virtue of resonance action by leakage and excitation inductances 5d and 5f of transformer 5 and capacitance of second capacitor 4 to magnetize transformer 5 in the counter direction.

As excitation current $I_{LP}$ for transformer 5 is negatively large at point $t_2$, excitation current $I_{LP}$ flows through excitation inductance 5f of transformer 5 with second inductance $L_2$ of small value. However when excitation current $I_{LP}$ decreases and comes to predetermined level $I_{A\ sat\ point\ tB}$, excitation current $I_{LP}$ runs through excitation inductance 5f of transformer 5 with first inductance $L_1$ of large value. Thus, transformer 5 is magnetized in the adverse direction while winding voltage on primary winding 5a drops, and when winding voltage diminishes below the product value of DC output voltage $V_{RL}$ and turn ratio $N_P/N_S$ of transformer 5, voltage clamp on primary winding 5a becomes released to cease energy transmission to secondary side. At the moment, only resonance current flows through resonant series circuit 14 in terms of resonance action by leakage and excitation inductances 5d and 5f of transformer 5 and capacitance of second capacitor 4. Then, when second MOS-FET 3 is turned off at point $t_3$, electric current flowing through resonant series circuit 14 is recovered or regenerated to DC power source 1 through parasitic diode 2a of first MOS-FET 2. At this time, since almost no voltage $V_{QH}$ is impressed between drain and source terminals of first MOS-FET 2, it is switched from off to on for zero voltage switching when voltage $V_{QH}$ reaches zero.

In the first embodiment shown in FIG. 1, when excitation current $I_{LP}$ for transformer 5 flowing through resonant series circuit 14 increases and exceeds predetermined value during the heavy load 12 greater than in usual operation, excitation inductance 5f reduces from first inductance $L_1$ of large value to second inductance $L_2$ of small value so that second capacitor 4 is electrically charged by larger resonance current $I_{LP}$ to augment charged amount in second capacitor 4, and therefore, full and enough amount of DC power can be supplied to load 12 through transformer 5 and rectifying smoother 9. Also, during light load 12 lower than in usual operation, both of electric current $I_{QH}$ through resonant series circuit 14 and excitation current $I_{LP}$ for transformer 5 do not exceed the predetermined value $I_A$ as shown in FIGS. 4 (D) and 4 (H) when first MOS-FET 2 is in the on condition, and therefore, excitation inductance 5f of transformer 5 is not subject to change to send excitation current $I_{LP}$ with first inductance $L_1$ of large value through resonant series circuit 14. This serves to repress excitation current $I_{LP}$ for transformer 5 to prevent reduction in power conversion efficiency in transformer 5. FIG. 4 (H) indicates control of excitation current $I_{LP}$ shown by a solid line the amount of which is smaller than that of excitation current in prior art behavior shown by dotted line in FIG. 4 (H) in the device of FIG. 15 during light load. In this way, a large amount of excitation current $I_{LP}$ does not flow through excitation inductance 5f in transformer 5 during light load to reduce power loss in transformer 5 for improvement in power conversion efficiency. Also, there is no need of varying oscillation frequency of first and second MOS-FETs 2 and 3 in a wide range throughout light and heavy load, thus the device can materialize the stable operation in any condition of load 12.

In the prior art current resonant switching power source device shown in FIG. 15, a constant amount of electric current flows through resonant series circuit 14 independently of the condition of load 12, and in particular, during light load, a large and same amount of electric current as that during heavy load flows through resonant series circuit 14, and this results in large power loss and considerable reduction in power conversion efficiency. On the contrary, in the first embodiment of the invention shown in FIG. 1, excitation inductance 5f of transformer 5 provides a variable inductance element so that during heavy load it has second inductance $L_2$ of small value to increase excitation current $I_{LP}$ and thereby supply necessary and sufficient amount of electric energy to second capacitor 4; on the other hand during light load excitation inductance 5f has advantageously first inductance $L_1$ of large value to restrain excitation current $I_{LP}$ with little reduction in power conversion efficiency during light load.

The foregoing embodiment may be modified or varied in various modes. For example, the first embodiment shown in FIG. 1 has gap 5n formed with notch 5o on a part of end surfaces 5l and 5m of intermediate legs 5k in E-shaped core halves 5g and 5h. Instead, a part of end surfaces 5l may have an inclined surface 5p with gap 5n between end surfaces 5l of a second embodiment shown in FIG. 5 (A). Not shown, but in place of inclined surface 5p, stepped gap may be formed between end surfaces 5l reducing the distance of gap. Any of these cases can result in gradually varying excitation inductance 5f with variation in excitation current $I_{LP}$ for transformer 5 by a graph shown in FIG. 5 (B) for operation of transformer 5 with optimal inductance value.

Figure 6:
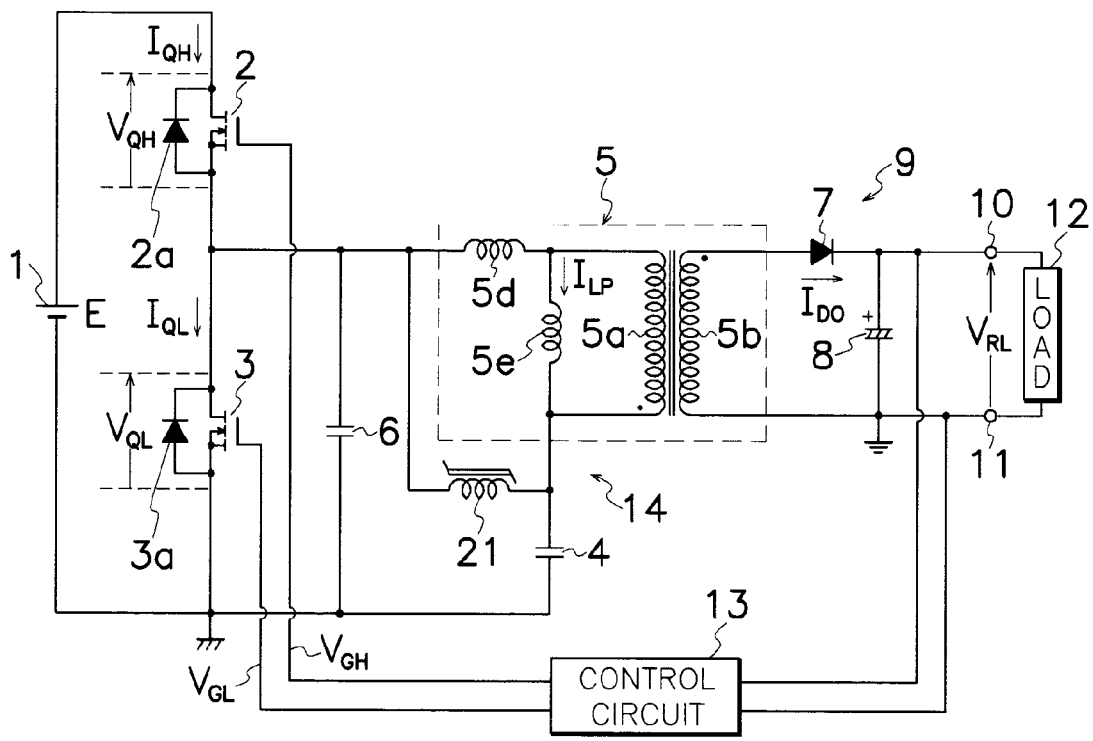
FIG. 6 is an electric circuit diagram showing a third embodiment of the present invention.

A third embodiment of the invention shown in FIG. 6, has a resonant series circuit 14 which comprises second capacitor 4a and a parallel circuit of primary winding 5a and leakage inductance 5d of transformer 5 and saturable reactor 21 connected in parallel to primary winding 5a and leakage inductance 5d. Saturable reactor 21 has an electric property capable of reducing its own inductance with magnetic saturation when electric current flowing through resonant series circuit 14 increases and comes to a predetermined value $I_A$. Consequently, like the first embodiment shown in FIG. 1, during heavy load 12 greater than in usual operation, saturable reactor 21 reduces the inductance by its magnetic saturation to send a larger amount of electric current through resonant series circuit 14 to charge second capacitor 4. Also, during light load 12 smaller than in usual operation, saturable reactor 21 increases the inductance to send a small amount of electric current through resonant series circuit 14 to charge second capacitor 4. Accordingly, even the third embodiment shown in FIG. 6 produces substantially similar functions and effects to those in the first embodiment shown in FIG. 1.

The first embodiment shown in FIG. 1 has transformer 5 of primary and secondary windings 5a and 5b in electro-magnetically coupled relation to each other in the adverse polarity so that during the on-period of first MOS-FET 2 excitation current $I_{LP}$ for transformer 5 charges second capacitor 4, and during the on-period of second MOS-FET 3, second capacitor 4 is discharged to transmit electric energy to secondary side of transformer 5. Alternatively, although detailed explanation is omitted, the present invention also contemplates a further embodiment of the current resonant switching power source device wherein transformer 5 may have primary and secondary windings 5a and 5b in electro-magnetically coupled relation to each other in the same polarity so that during the on-period of first MOS-FET 2 excitation current $I_{LP}$ for transformer 5 charges second capacitor 4, while simultaneously transmitting electric energy to secondary side of transformer 5, and during the on-period of second MOS-FET 3, second capacitor 4 is discharged to regenerate excitation energy in transformer 5 to DC power source 1 because such an embodiment can acquire substantially similar functions and effects to those in the foregoing embodiments.

Figure 7:
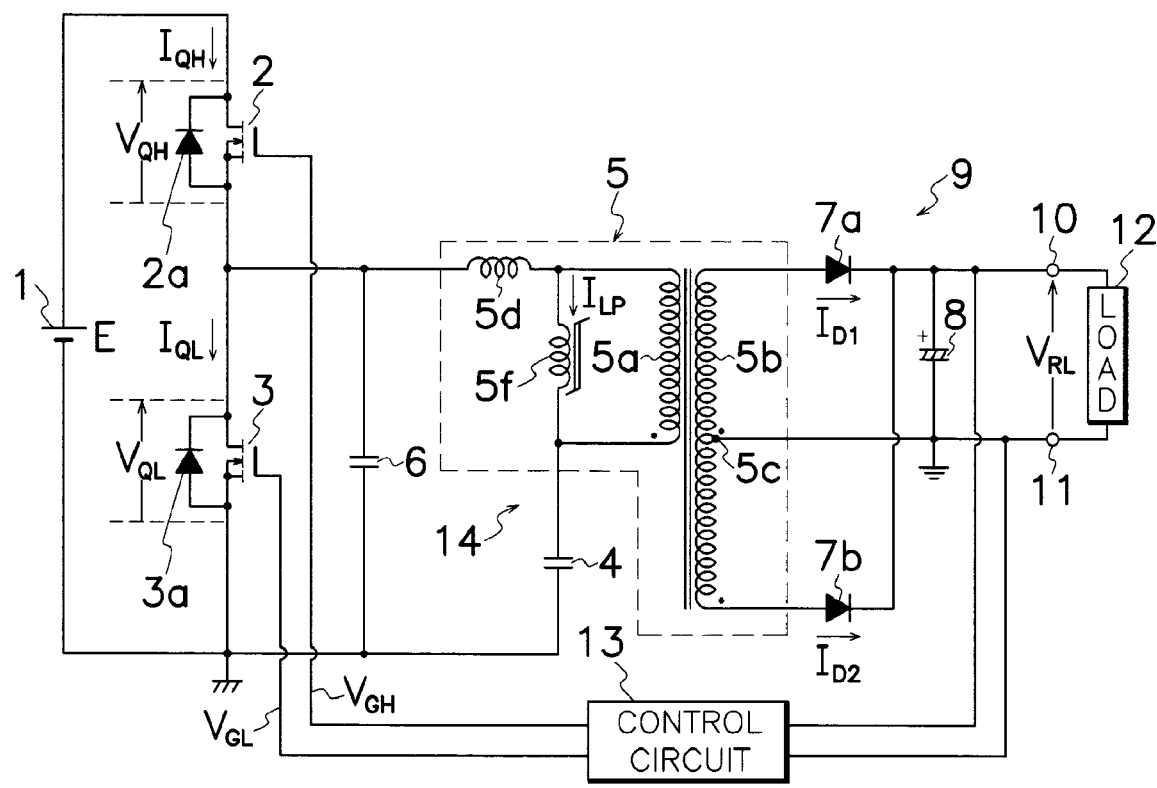
FIG. 7 is an electric circuit diagram showing a fourth embodiment of the present invention.

A fourth embodiment shown in FIG. 7 of the present invention is characterized in that primary and secondary windings 5a and 5b of transformer 5 are electro-magnetically coupled to each other in the same polarity; an intermediate tap 5c is provided in secondary winding 5b; first and second output rectifying diodes 7a and 7b are connected to respectively top and bottom ends of secondary winding 5b; and rectifying smoother 9 has output smoothing capacitor 8 connected to a junction of first and second output rectifying diodes 7a and 7b and intermediate tap 5c of secondary winding 5b for full wave rectification. In the fourth embodiment shown in FIG. 7, while first MOS-FET 2 is in the on-condition, second capacitor 4 is electrically charged by excitation current $I_{LP}$ for transformer 5, and at the same time, AC voltage produced on secondary winding 5b is rectified through first output rectifying diode 7a and smoothed by output smoothing capacitor 8 to supply DC power of voltage $V_{RL}$ to load 12. Then, while second MOS-FET 3 is in the on-condition, electric current discharged from second capacitor 4 causes electromagnetic energy in transformer 5 to recover to DC power source 1, and at the same time, AC voltage produced on secondary winding 5b is rectified through second output rectifying diode 7b and smoothed by output smoothing capacitor 8 to supply DC power of voltage $V_{RL}$ to load 12. First and second MOS-FETs 2 and 3 are alternately turned on and off for the same on-period. When load 12 becomes heavier than in usual operation, control circuit 13 drives first and second MOS-FETs 2 and 3 with the extended on-period to increase excitation current $I_{LP}$ for transformer 5, thereby augment charged and discharged amount of second capacitor 4, and increment electric energy to be transmitted to secondary side of transformer 5. In this way, control circuit 13 varies switching frequency of first and second MOS-FETs 2 and 3 to thereby control DC output voltage $V_{RL}$ applied on load 12.

Even in fourth embodiment shown in FIG. 7, similarly to the device shown in FIG. 1, electric energy is transmitted to secondary side of transformer 5 for a half cycle in sine wave of resonance frequency determined by leakage inductance 5d and capacitance of second capacitor 4, and therefore, first and second MOS-FETs 2 and 3 are set for the on-period equivalent to or more than a half cycle in sine wave of the resonance frequency. Accordingly, a large amount of excitation current $I_{LP}$ flows for transformer 5 during light load, however, if a pair of E-shaped core halves 5g and 5h shown in FIG. 2 (A) are used for a core in transformer 5 shown in FIG. 7, during light load, excitation inductance 5f of transformer 5 has first inductance $L_1$; during heavy load, when excitation current $I_{LP}$ for transformer 5 increases and transforms excitation inductance 5f into second inductance $L_2$ of smaller value than that of first inductance $L_1$; during light load a small and repressed amount of excitation current $I_{LP}$ flows through excitation inductance 5f to improve power conversion efficiency; during heavy load a large amount of excitation current $I_{LP}$ flows through excitation inductance 5f to transmit full and sufficient amount of electric energy to secondary side of transformer 5.

Figure 8:
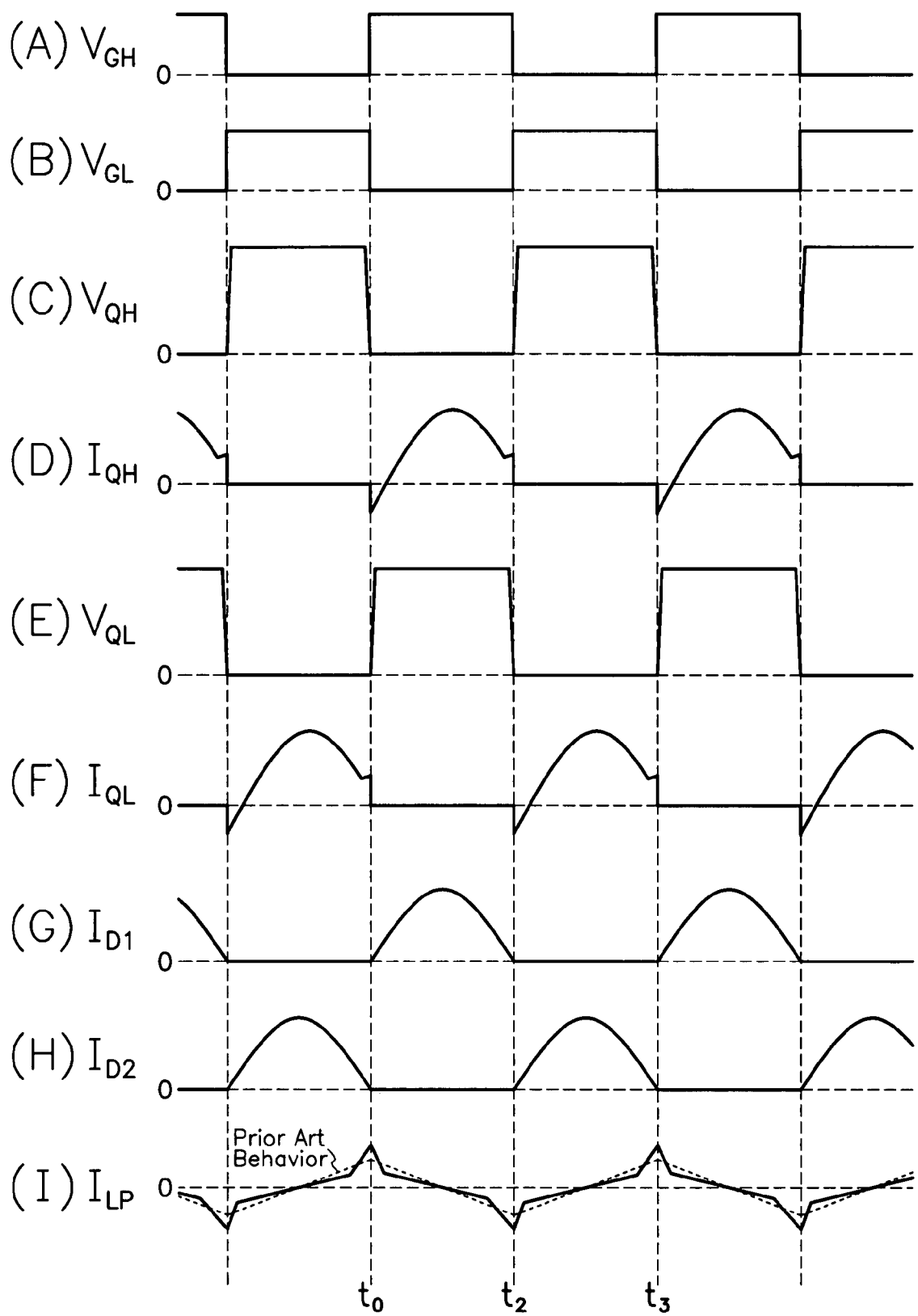
FIG. 8 is a waveform chart indicating variation in voltages and electric currents at selected locations in the circuit diagram shown in FIG. 7 during the heavy load.
Figure 9:
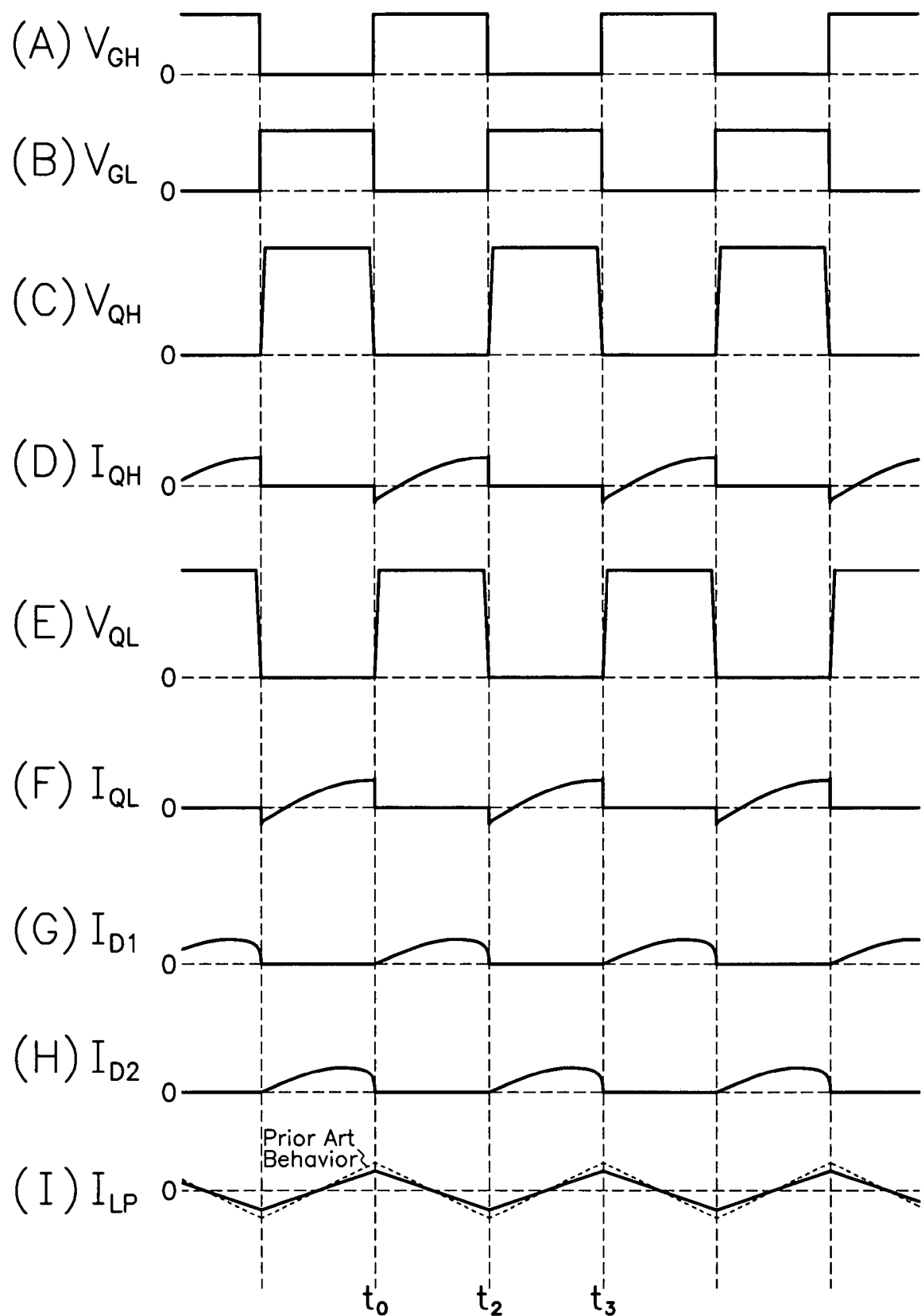
FIG. 9 is a waveform chart indicating variation in voltages and electric currents at selected locations in the circuit diagram shown in FIG. 7 during the light load.

FIGS. 8 and 9 are waveform charts indicating variation in voltages and electric currents at selected locations in the circuit diagram shown in FIG. 7 during respectively the heavy and light loads wherein time charts (A) and (B) represent voltage variation in drive signals $V_{GH}$ and $V_{GL}$ applied to each gate terminal of first and second MOS-FET 2 and 3; (C) and (D) represent respectively voltage $V_{QH}$ applied between drain and source terminals of first MOS-FET 2, and electric current $I_{QH}$ flowing through first MOS-FET 2; (E) and (F) represent respectively voltage $V_{QL}$ applied between drain and source terminals of second MOS-FET 3, and electric current $I_{QL}$ flowing through second MOS-FET 3; (G) and (H) represent electric currents $I_{D1}$ and $I_{D2}$ flowing through respectively first and second output diodes 7a and 7b of rectifying smoother 9; and (I) represents excitation current $I_{LP}$ flowing through excitation inductance 5f of transformer 5. Excitation current $I_{LP}$ flowing through excitation inductance 5f of transformer 5 has the smaller amplitude than that of excitation current in prior art behavior shown by dotted line of FIG. 9 in the device of FIG. 15 during light load, however, FIG. 8 (H) indicates excitation current $I_{LP}$ having the higher amplitude than that of excitation current in prior art behavior shown by dotted line in the device of FIG. 15 during heavy load. In addition, the fourth embodiment shown in FIG. 7 carries out alternate and simultaneous on-off operation of first and second MOS-FET 2 and 3 with the on-period of the same time length between points $t_0$ and $t_2$ and between $t_2$ and $t_3$, and therefore, excitation current $I_{LP}$ flowing through excitation inductance 5f has the same positive and negative amplitude across zero line during both of heavy and light loads as shown in FIGS. 8 (H) and 9 (H) without biased magnetization in the negative direction as in FIG. 18 during heavy load.

Figure 10:
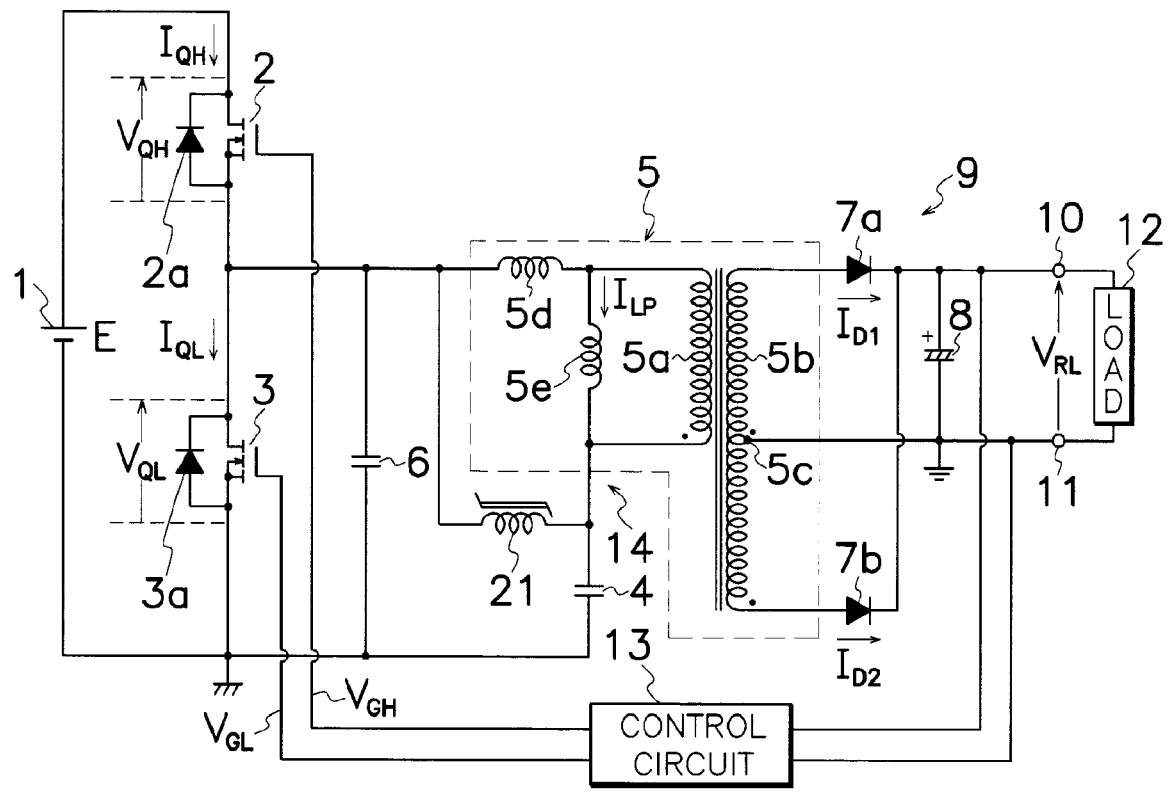
FIG. 10 is an electric circuit diagram showing a fifth embodiment of the present invention.
Figure 11:
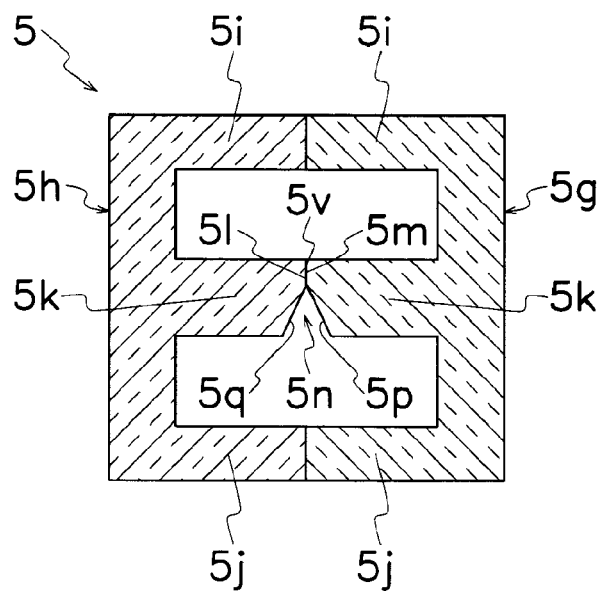
FIG. 11 is a sectional view of a core in a transformer used in a sixth embodiment of the present invention.

A similar modification to that in the fourth embodiment shown in FIG. 7 can be made in the third embodiment shown in FIG. 6 to fit it into a fifth embodiment of the present invention shown in FIG. 10 wherein primary and secondary windings 5a and 5b of transformer 5 are electro-magnetically coupled to each other in the same polarity; an intermediate tap 5c is provided in secondary winding 5b; first and second output rectifying diodes 7a and 7b are connected to respectively top and bottom ends of secondary winding 5b; and rectifying smoother 9 has output smoothing capacitor 8 connected to a junction of first and second output rectifying diodes 7a and 7b and intermediate tap 5c of secondary winding 5b for full wave rectification. Accordingly, similarly to the third embodiment shown in FIG. 6, the fifth embodiment shown in FIG. 10 has an advantage of more increasing excitation current flowing through resonant series circuit 14 during heavy load while charging and discharging fourth capacitor 4 to acquire substantially similar functions and effects to those in FIG. 6.

Without limitation to shapes and constructions shown in FIGS. 2 (A) and 5 (A), core halves 5g and 5h for transformer 5 shown in FIGS. 1 and 7 can be modified in various modes. For example, a sixth embodiment shown in FIG. 11 may have a tapered gap 5n defined by a pair of opposite inclined surfaces 5p and 5q on end surfaces 5l and 5m of intermediate legs 5k in a pair of E-shaped core halves 5g and 5h. Likewise, but not shown, gap 5n may be formed by providing a similar notch 5o to that in FIG. 2 (A) on end surfaces 5l and 5m of intermediate legs 5k of FIG. 11.

Figure 12:
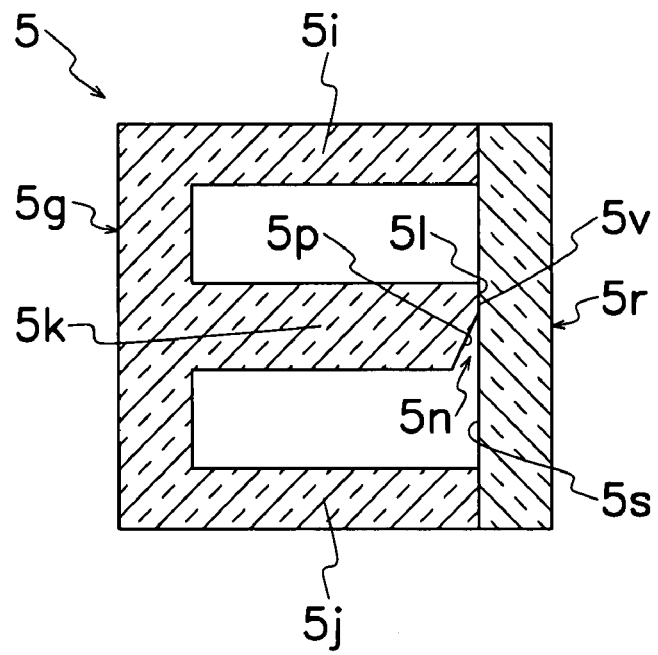
FIG. 12 is a sectional view of a core in a transformer used in a seventh embodiment of the present invention.
Figure 13:
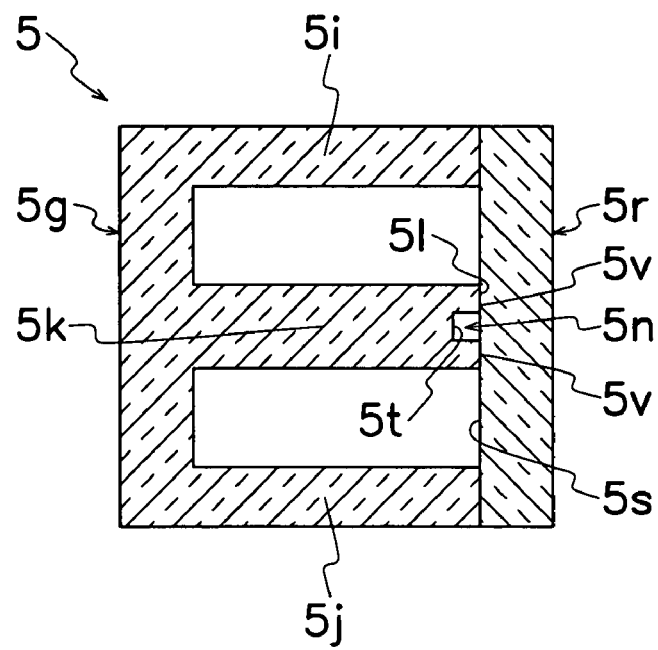
FIG. 13 is a sectional view of a core in a transformer used in an eighth embodiment of the present invention.

In addition, away from combination of paired E-shaped core halves 5g and 5h, modifications can be made as shown in FIGS. 12 and 13 to adopt E-shaped and I-shaped core halves. A seventh embodiment shown in FIG. 12 has an E-shaped core half 5g and I-shaped core half 5r positioned in opposed relation to each other to form a closed magnetic circuit or circuits, and primary and secondary windings 5a and 5b are wound around a bobbin (not shown) surrounding intermediate leg 5k of E-shaped core half 5g. A convergent gap 5n is formed with an inclined surface 5p on an end surface 5l of intermediate leg 5k so that convergent gap 5n is gradually reduced toward reduced section area 5v. A eighth embodiment shown in FIG. 13 has a coaxial notch 5t on end surface 5l of intermediate leg 5k to form a gap 5n between I-shaped core half 5r and intermediate leg 5k. In lieu of inclined surface 5p or coaxial notch 5t, a notch 5o similar to that in FIG. 2 (A) may be formed on end surface 5l of intermediate leg 5k. Similar functions and effects to those in embodiments in FIGS. 2 (A) and 5 (A) can also be obtained in any of embodiments shown in FIGS. 11 to 13.

Figure 14:
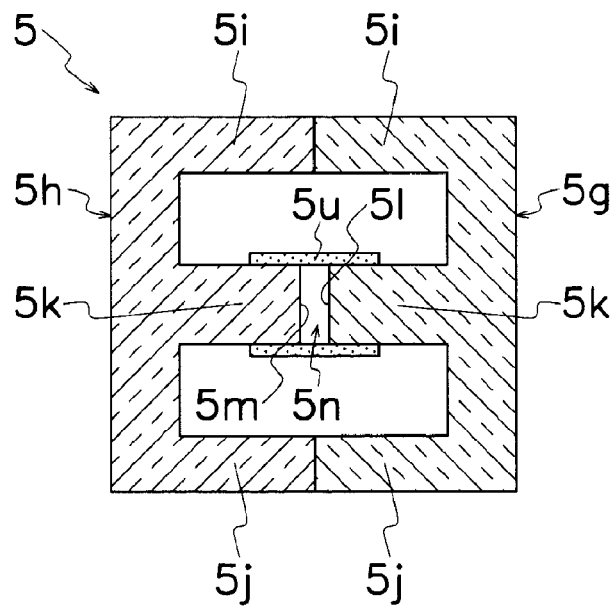
FIG. 14 is a sectional view of a core in a transformer used in a ninth embodiment of the present invention.

In place of gap 5n formed with notch 5o or inclined surface or surfaces 5p on reduced section area 5v of end surfaces 5l and 5m, a ninth embodiment shown in FIG. 14 may comprise a gap 5n of a given distance formed between end surfaces 5l and 5m of intermediate legs 5k and a tubular magnetic collar 5u attached on intermediate legs 5k for surrounding gap 5n. Magnetic collar 5u has a higher saturation magnetic flux density than that of magnetic material such as ferrite constituting E-shaped core halves 5g and 5h. Accordingly, ninth embodiment shown in FIG. 14 indicates increase in excitation current $I_{LP}$ due to first inductance $L_1$ of large value determined by saturation magnetic flux density in a small range of excitation current $I_{LP}$ when voltage is applied on primary winding 5a of transformer 5. When excitation current $I_{LP}$ for transformer 5 reaches a predetermined value $I_4$, magnetic collar 5u becomes magnetically saturated to change core halves 5g and 5h to second inductance $L_2$ of small value determined by saturation magnetic flux density in gap 5n between end surfaces 5l and 5m of intermediate legs 5k so that increase in magnetic flux φ is reduced with increase in excitation current $I_{LP}$. Accordingly, substantially similar functions and effects to those in embodiments shown in FIGS. 2 (A) and 5 (A) can be obtained in ninth embodiment in FIG. 14. Also, ninth embodiment can beneficially utilize a leakage transformer of typical center pole gap type to obtain the functions and effects of the invention only by easy design alteration to attach magnetic collar or material 5u of relatively high saturation magnetic flux density to gap 5n between E-shaped core halves 5g and 5h.

Embodiments of the present invention can further be altered in various modes without limitation to the foregoing embodiments. For example, FIGS. 1 and 7 illustrate gaps 5n with reduced section area 5v between contacted end surfaces 5l and 5m of intermediate legs 5k in transformer 5, but, in this case, end surfaces 5l and 5m may be in spaced relation to each other with reduced section area 5v. Also, embodiments shown in FIGS. 5 (A), 11 and 12, have an inclined surface or surfaces 5p and 5q on a part of end surfaces 5l and 5m in intermediate legs 5k, however, an inclined surface or surfaces 5p and 5q may be formed on whole end surfaces 5l and 5m of intermediate legs 5k. In brief, transformer 5 utilized in embodiments shown in FIGS. 1 and 7 only needs a gap 5n for keeping end surfaces 5l and 5m in a spaced relation to each other and/or a reduced section area 5v formed with gap 5 for bringing end surfaces 5l and 5m into contact to each other, and therefore, various shapes can be applied to gap 5n between intermediate legs 5k including those in the shown embodiments. In addition, embodiments shown in FIGS. 12 and 13 illustrate gaps 5n formed between end surface 5l of intermediate leg 5k in E-shaped core half 5g and I-shaped core half 5r. Otherwise, while contacting end surface 5l of intermediate leg 5k on I-shaped leg 5r, each of outer legs 5l and 5j may have the different length to form two gaps of different distance between each end surface of one and the other outer legs 5l and 5j and a side surface 5s of I-shaped core 5r. Ninth embodiment shown in FIG. 14 illustrates tubular magnetic collar 5u of relatively high saturation magnetic flux density for surrounding gap 5n between end surfaces 5l and 5m of intermediate legs 5k. Alternatively, the core may have further E-shaped core halves of relatively high saturation magnetic flux density having the same shape as that of E-shaped core halves 5g and 5h to combine these further E-shaped core halves and core halves 5g and 5h for definition of closed magnetic circuits.

According to the present invention, the device can accumulate adequate amount of electric energy in second capacitor in resonant series circuit with less amount of excitation current which can be more increased with reduction in excitation inductance for transformer during heavy load greater than in usual operation. Also, the device can repress power loss in transformer by controlling excitation current with increase in excitation inductance of transformer. Accordingly, the device can reduce power loss in transformer to improve power conversion efficiency regardless of load condition, and perform steady operation in any load condition without need of varying switching frequency in a wide range depending on load condition. The present invention is preferably applicable to a resonant switching power source device having a transformer and a resonant series circuit.

What is claimed are:

1. A resonant switching power source device, comprising first and second switching elements connected in series to a DC power source;
   a resonant series circuit which comprises a current resonance capacitor, and a primary winding and an inductance of a transformer connected in parallel to said first or second switching element; and
   a rectifying smoother connected to a secondary winding of said transformer;

said transformer comprising:

a magnetic core of first and second core halves coupled together in opposed relation to each other to form at least one closed magnetic circuit for supporting said primary and secondary windings wound around said first and second core halves; and a gap defined between end surfaces of said first and second core halves by spaced relation of said end surfaces to also form a reduced section area by contacting the end surfaces;

the on-off operation of said first and second switching elements causing a resonance current to flow through said resonance capacitor, primary winding and inductance of the transformer, and first or second switching element to produce a DC output from said secondary winding of the transformer through said rectifying smoother;

wherein said reduced section area comes to magnetic saturation to reduce an excitation inductance of said transformer when a large amount of electric current flows through said resonant series circuit; and the excitation inductance of the transformer is increased when a small amount of electric current flows through said resonant series circuit.

2. The resonant switching power source device of claim 1, wherein said gap is formed with a notch or depression provided on end surfaces of said first and second core halves.

3. The resonant switching power source device of claim 1, wherein said gap is formed with a ramp provided on a part or whole of the end surfaces of said first and second core halves.

4. A resonant switching power source device, comprising first and second switching elements connected in series to a DC power source;

a resonant series circuit connected in parallel to said first or second switching element, said resonant series circuit comprising a current resonance capacitor, and a primary winding and an inductance of a transformer; and a rectifying smoother connected to a secondary winding of said transformer;

said transformer comprising:

a magnetic core of first and second core halves coupled together in opposed relation to each other to form at least one closed magnetic circuit for supporting said primary and secondary windings wound around said first and second core halves;

a gap defined between spaced end surfaces of said first and second core halves; and a magnetic material for surrounding said gap, said magnetic material having a different saturation magnetic flux density from that of said core halves;

the on-off operation of said first and second switching elements causing a resonance current to flow through said resonance capacitor, primary winding and inductance of the transformer and first or second switching element to produce a DC output from said secondary winding of the transformer through said rectifying smoother;

wherein said magnetic material comes to magnetic saturation to reduce an excitation inductance of said transformer when a large amount of electric current flows through said resonant series circuit; and the excitation inductance of the transformer is increased when a small amount of electric current flows through said resonant series circuit.

5. A resonant switching power source device, comprising first and second switching elements connected in series to a DC power source;

a resonant series circuit connected in parallel to said first or second switching element, said resonant series circuit comprising a current resonance capacitor, and a primary winding and an inductance of a transformer; and a rectifying smoother connected to a secondary winding of said transformer;

said transformer comprising a saturable reactor connected in parallel to said primary winding and inductance of said transformer;

the on-off operation of said first and second switching elements causing a resonance current to flow through said resonance capacitor, primary winding and inductance of the transformer and first or second switching element to produce a DC output from said secondary winding of the transformer through said rectifying smoother;

wherein said saturable reactor comes to magnetic saturation to reduce an excitation inductance of said transformer when a large amount of electric current flows through said resonant series circuit; and the excitation inductance of the transformer is increased when a small amount of electric current flows through said resonant series circuit.

\* \* \* \* \*